Patented July 10, 1951

2,559,660

UNITED STATES PATENT OFFICE 2,559,660

CYANOETHYLATION OF ALKYL LACTATES

Chessie E. Rehberg, Glenside, Pa., assignor to the United States of America as represented by the Secretary of Agriculture No Drawing. Application December 1, 1950, Serial No. 198,718

2 Claims. (Cl. 260—465.4)

(Granted under the act of March 3, 1883, as amended April 30, 1928; 370 O. G. 757)

The invention herein described may be manufactured and used by or for the Government of the United States of America for governmental purposes throughout the world, without the payment to me of any royalty thereon.

This invention relates to the cyanoethylation of alkyl lactates and the resulting ethers.

In general according to the invention, cyanoethylation of the alkyl lactate is accomplished by reacting the alkyl lactate with acrylonitrile in the presence of an alkaline reaction catalyst according to the following equation:

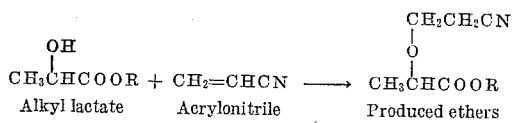

where R is a lower alkyl group.

The cyanoethylation is expeditiously effected by first dissolving a strongly alkaline catalyst, such as an alkali metal, alkali alcoholate or hydroxide, or a quaternary ammonium hydroxide, in the alkyl acrylate and then adding acrylonitrile to the solution, slowly, with agitation, at a temperature between 0° and 100° C., preferably at 40° to 80° C. The resulting mixture is then maintained at 20° to 80° C., for a length of time sufficient to bring the reaction substantially to completion, which is usually attained within 1 to 24 hours, whereupon the catalyst is neutralized, preferably by an addition of acetic acid, and the resulting ether recovered by any suitable means, for instance by distillation. The process can be conducted using equimolecular amounts of reactants, although higher conversion to the resulting ether is usually attained on utilizing an excess of acrylonitrile.

The ethers of this invention possess properties which render them useful as high-boiling solvents, as plasticizers and modifying agents for plastic compositions and as chemical intermediates.

The following examples illustrate the invention in greater detail.

Example I

One gram of sodium was dissolved in 146 g. (1 mole) of butyl lactate, and 53 g. (1 mole) of acrylonitrile was added slowly, with agitation, while maintaining the temperature at 40° to 50° C. The mixture was then allowed to stand overnight at room temperature after which it was acidified with acetic acid and distilled under vacuum.

The 2-cyanoethyl-1-carbobutoxyethyl ether, $n_D^{20}$ 1.434, $d_4^{20}$ 1.004, was collected at 105° C./0.6 mm. The yield was 79 grams corresponding to 40% conversion and 57% based on unrecovered butyl lactate.

On following the same procedure but using 3 moles of acrylonitrile in lieu of 1 mole, the conversion was increased to 58%, based on pure redistilled product.

Example II

One mole of methyl lactate was reacted with two moles of acrylonitrile as described in Example I.

Distillation of the reaction mixture yielded 2-cyanoethyl-1-carbomethoxyethyl ether, B. P. 90° C./1.2 mm., $n_D^{20}$ 1.434, $d_4^{20}$ 1.068, in an amount corresponding to 51% conversion.

Example III 2-cyanoethyl-1-carbethoxyethyl ether, B. P. 90° C./0.7 mm., $n_D^{20}$ 1.430, $d_4^{20}$ 1.043, was obtained by the procedure of Example I on reacting equimolecular amounts of ethyl lactate and acrylonitrile.

Similar results are obtained by analogous procedures on using in place of the methyl, ethyl and butyl lactate of the foregoing examples the corresponding amounts of other esters or amides of lactic acid, such as isopropyl, sec.-butyl, isobutyl, amyl, octyl, 2-ethoxyethyl, 2-butoxyethyl, tetrahydrofurfuryl, benzyl, cyclohexyl, or in general, any lactate ester, or dimethyl-, diethyl-, dibutyl-, or other dialkyllactamide. If amides having one or more hydrogen atoms on the nitrogen atom are used, they will react with acrylonitrile first at the amide and then at the hydroxyl group to produce bis- or tris-2-cyanoethyl derivatives. In lieu of sodium, other alkaline substances such as potassium, sodamide, sodium hydride or quaternary ammonium hydroxides may be used as catalysts in the reaction.

I claim:

1. A process comprising reacting a lower alkyl lactate with acrylonitrile in the presence of an alkaline catalyst to produce an ether having the formula

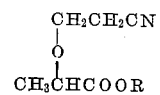

where R is a lower alkyl group.

2. An ether having the formula

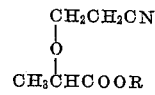

where R is a lower alkyl group.

CHESSIE E. REHBERG.

No references cited.